C. H. PETERSON.
WHEEL.
APPLICATION FILED JAN. 6, 1916.
1,219,661. Patented Mar. 20, 1917.
2 SHEETS—SHEET 1.
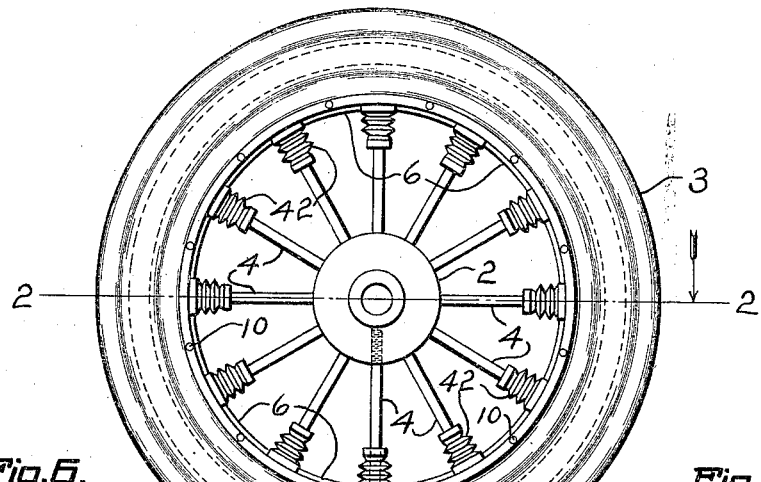
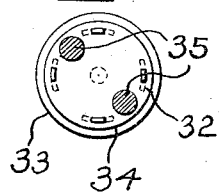
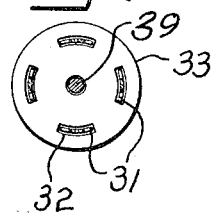
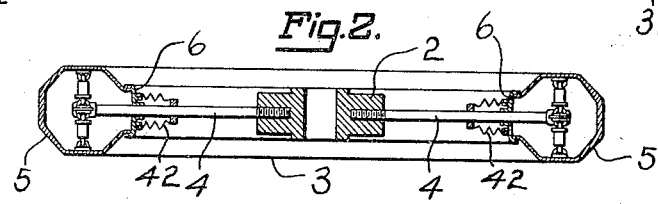
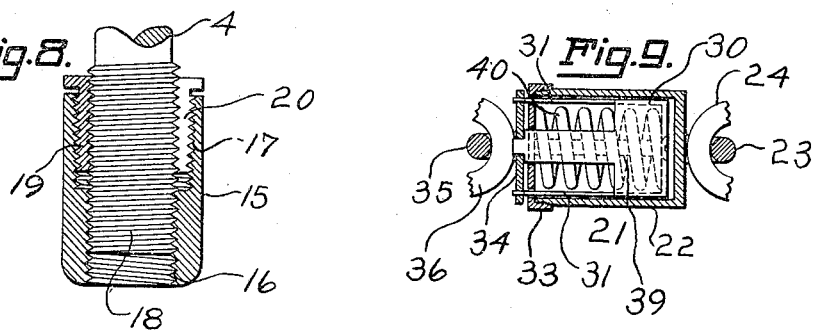

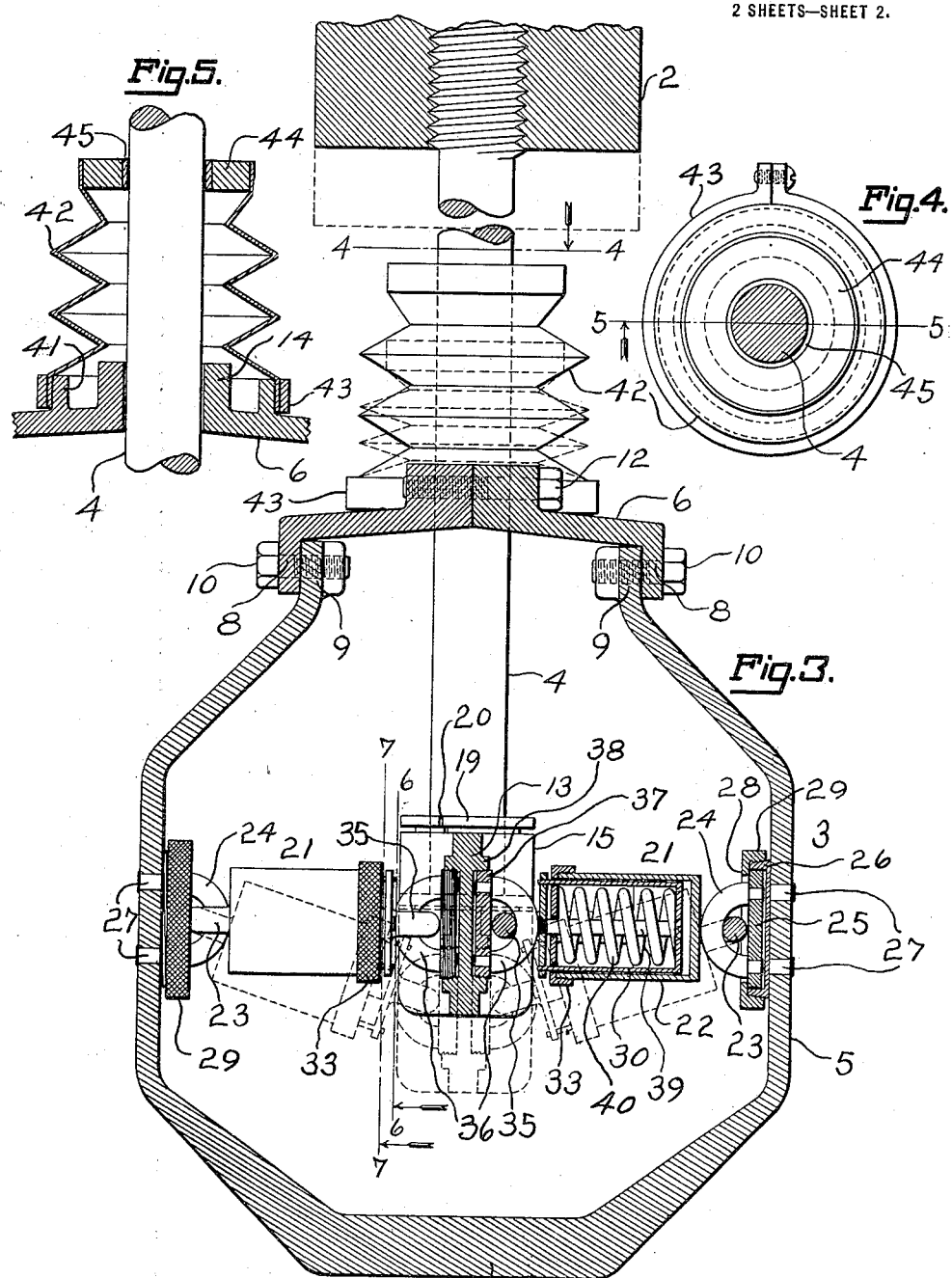

UNITED STATES PATENT OFFICE.

CHARLES H. PETERSON, OF HARTFORD, CONNECTICUT.

WHEEL.

1,219,661.  Specification of Letters Patent.  Patented Mar. 20, 1917.

Application filed January 6, 1916.  Serial No. 70,589.

*To all whom it may concern:*

Be it known that I, CHARLES H. PETERSON, a citizen of the United States, residing at Hartford, in the county of Hartford and State of Connecticut, have invented certain new and useful Improvements in Wheels, of which the following is a specification.

This invention relates to wheels. While a wheel involving the invention is susceptible of advantageous use when applied to vehicles of various kinds, it is of especial utility when employed in conjunction with automobiles. The object of the invention is to provide an article of this character having maximum strength yet possessing resiliency and the ability to resist shocks such as would ensue in the starting and stopping of vehicles and while they are in motion, heavily loaded or otherwise.

In the drawings accompanying and forming part of the present specification I have shown in detail one convenient form of embodiment of the invention which to enable those skilled in the art to practice the same will be set forth fully in the following description. I do not restrict myself to this precise disclosure; I may depart therefrom in several respects within the scope of the invention defined by the claims following said description.

Referring to said drawings:

Figure 1 is a side elevation of a wheel involving the invention, the lower part thereof being broken away and in section.

Fig. 2 is a horizontal section on the line 2—2 of Fig. 1, looking in the direction of the arrow.

Fig. 3 is a vertical transverse sectional view of practically the lower portion of the wheel.

Fig. 4 is a horizontal section on the line 4—4 of Fig. 3.

Fig. 5 is a vertical section on the line 5—5 of Fig. 4.

Figs. 6 and 7 are cross sections on the lines 6—6 and 7—7 respectively of Fig. 3, looking in the direction of the arrows.

Fig. 8 is a detail view in section on the line 8—8 of Fig. 1, and,

Fig. 9 is a horizontal sectional view of a shock absorbing element and certain of its adjuncts.

Like characters refer to like parts throughout the several views, which are on different scales.

The wheel comprises a hub as 2, a tire as 3 and spokes as 4. There may be any desirable number of spokes, the inner ends thereof as shown being tapped into the hub. The tire 3 as will hereinafter appear is of composite construction, its subordinate elements generally being made from sheet metal. The hub 2 may be also of metal, while the spokes 4 can be of similar material. The substance, however, from which any part is constructed is not a matter of moment. As will hereinafter appear the spokes 4 are not directly connected with the tire 3.

Said tire 3 comprises a body or main member as 5 and an auxiliary member as 6. The part 5 presents a tread or casing portion of the tire, while the part 6 constitutes a cover piece for the inner open side of the body or case 5. This body or case 5 as shown is approximately octagonal in cross section, the lower face being thickened as at 7 to present the tread part of the tire. The body or tread member 5 as will be understood, is circular and receives within it the closing member 6 also of circular form, this closing member which as will be understood covers the inner open side of the body member having outwardly extending flanges 8 overlying inwardly extending flanges 9 on the inner side of said body member and at opposite sides of the opening therein, the two sets of flanges being united in any desirable manner as by the screws 10 extending through the flanges 8 and tapped into the flanges 9 and into bosses 11 extending inwardly therefrom. This closing member or cap piece consists as shown of two practically similar sections which abut and which are united rigidly in some convenient manner as by the screws 12. The tire 3, therefore, consists virtually of an inclosed casing, the spokes 4 extending into the casing-like tire and being connected to a circular bodily movable element as 13 hereinafter more particularly described. Said spokes 4 project through annular flanges 14 on the inner side of the cover member 6, disposed centrally of the width thereof and formed by mating and abutting semi-circular flanges formed on the respective sections of said part 6. As represented this circular bodily movable member 13 has at regular intervals the cylindrical enlargements or bosses 15 interiorly threaded as at 16 and 17 respectively. Each of the bosses or enlargements 15 is internally of two diameters, the threads 16 being within the smaller internal diametrical portion of the respective flanges 14, while the threads 17 are in the larger portions thereof. The threads 16 are engaged by the threads 18 at the outer ends of the spokes 4. The threads 17 of the respective bosses are engaged by the external threads of bushings 19 internally threaded to receive the threads of the respective spokes. These bushings 19 outwardly beyond their heads are split or slotted as at 20 so as to provide for the contractibility of the bushings and thereby provide for the more secure connection of the spokes with the element 13. I prefer to make the various threads of pipe or taper form by which substantial seatings of the respective threaded parts is insured.

The annular member is in the form of a practically flat circular band, being free or out of contact with the tire 3 which incloses it. It has, however, an operative connection with the tire through the intervention of buffing or shock absorbing elements of suitable kind inclosed by the tire and preferably connected respectively with said annular member or circular band 13 and tire. These buffing or shock absorbing elements are preferably connected with the parts in question by universal joints, thus insuring the maximum flexibility. Each of the said buffing or shock absorbing elements is denoted in a general way by 21. They are the same in construction, so that a detailed description of one will apply to the others. They are arranged in pairs preferably, the members of each pair being opposite each other, and in the organization shown there are four of such elements between each pair of spokes, two of such elements being between the annular element and the tire at one side of the said annular element and the other two being similarly disposed at the opposite side of said annular element. The opposite elements 21 counterbalance each other, their springs (hereinafter described) in the present case being of equal resisting ability.

In Fig. 9 I have shown in detail one of the shock absorbing or buffing elements 21. It comprises a cup 22 of approximately cylindrical form, having rigid with its outer closed end the staple 23 interlooped loosely in the staple 24 connected as by riveting to the disk 25 (Fig. 3) fitting the cupped disk 26 suitably secured as by rivets 27 to the adjacent flat inner face of a side of the body member 5. The riveted carrying disk 25 is suitably held in the cupped disk 26 as by the inwardly extending annular flange 28 of the ring 29 threaded onto the body portion of said cupped disk. This gimbal-joint is one way of connecting a buffing or shock absorbing or resisting element as 21 with the tire. The cup or casing 22 incloses for sliding movement the shallow cup 30 from the inner edge of which there extend inwardly the approximately equidistantly spaced projections 31 which extend through curved slots 32 (Figs. 6, 7 and 9) in the cover 33 threaded onto the casing 22. The reduced inner ends of these projections 31 project through slots in the plate 34 and are bent or headed over the inner surface of said plate 34 which as will be clear is rigidly connected with the shallow cup 30 for movement therewith. The plate or disk 34 has riveted or otherwise suitably connected with it the staple 35 which is freely interlooped with a practically similar staple 36 riveted or otherwise connected to a disk 37 threaded into a hub or boss 38 projecting laterally from the annular member 13 substantially centrally of the depth thereof, this construction providing for the universal connection of the inner portion of the buffing element 21 with said annular element 13. Extending through the outer closed end of the slidable cup 30 is the screw 39 threaded at its forward end into the disk or plate 34 and extending freely through the cap or cover 33. Surrounding the screw or pin 39 is a coiled spring 40, one end of which bears against the relatively fixed cap or cover 33 and the other end of which bears against the closed outer end of the cup 30, this spring being constantly under tension which is increased on the relative motion of the tire 3 and annular element 13. I desire to call attention to the fact that the springs 40 are of "compression" type and that they are also free notwithstanding the fact that they are incased. By free I mean a spring that is not connected with anything as would be the case were it provided with a hook or hooks interengaged with another element.

In Fig. 3 the parts are shown as occupying their normal positions by full lines. On relative motion between the tire 3 and annular member 13 the resisting elements 21 are moved relatively to the dotted line positions, thus taking up shock due to the starting of the wheel, its stopping or while it is rotating, the amount of movement of the said elements 21 depending upon the shock or load. On the movement of the elements 21 from their normal to their dotted line positions for example, the springs 40 are compressed, thus absorbing the shock and enabling the springs to yieldingly return the parts to their initial positions when the load is removed.

The bosses 14 are surrounded my annular flanges 41 externally embraced by the outer ends of the tubular bellows-like dust guards 42 held to the respective flanges by clamps as 43. These dust guards may be of canvas or other suitable material. Rings as 44 are fitted into the inner ends of said dust guards 42, being rigidly held in place in some suitable manner. Said rings in turn receive bushings as 45 fastened in place to the respective rings in some convenient manner. These bushings closely surround the respective spokes 4, the fit, however, not being enough to prevent proper sliding movement of said spokes. The construction in question provides an effective means to exclude dust and other matter from the hollow tire 3.

As will be clear I do not restrict myself to the use of any particular type of shock absorbing elements between the tire 3 and the annular spoke-carrying member 13 or equivalents. Shock absorbing elements involving incased and compressed springs are advantageous as no especial injury can occur in case a spring should from any cause snap.

What I claim is:

1. A wheel comprising a tire, a hub, spokes connected with the hub, an annular member inclosed by and free of the tire, said spokes being connected with said annular member, disks connected with opposite sides of the annular member and provided with staples rigidly connected therewith, disks carried by opposite sides of the tire within the same and provided with rigid staples, and shock absorbing elements between the annular member and the tire provided with resiliently associated members having staples connected respectively with the series of staples on the annular member and tire respectively.

2. A wheel comprising a tire, a hub, spokes connected with the hub, an annular member inclosed by and free of the tire, said spokes being connected with said annular member, disks threaded into opposite sides of said annular member and provided with staples rigidly connected therewith, disks having a screw-threaded connection with opposite sides of the tire within the same and provided with staples, and shock absorbing elements comprising yieldably associated members provided with staples connected respectively with the two other series of staples.

3. A wheel comprising a tire, a hub, spokes connected with the hub, an annular member inclosed by the tire and to which the spokes are connected, and shock absorbing elements between the annular member and tire, each shock absorbing element having a cup connected at one end by a universal joint with the tire, a cap inclosing said cup, a second cup inclosed by the first cup, a compression spring bearing against the cap and the bottom of the second cup, the second cup having projections and the cap being slotted to receive said projections, and a plate rigidly connected to said projections and united by a universal joint with said annular member.

In testimony whereof I affix my signature in presence of two witnesses.

CHARLES H. PETERSON.

Witnesses:
L. L. MARKEL,
HEATH SUTHERLAND.

Copies of this patent may be obtained for five cents each, by addressing the "Commissioner of Patents, Washington, D. C."